United States Patent [19]

Sarides

[11] 4,222,695
[45] Sep. 16, 1980

[54] FLOOR MATTING

[76] Inventor: Anthanase K. Sarides, Willowdale, Canada

[21] Appl. No.: 66,348

[22] Filed: Aug. 13, 1979

[51] Int. Cl.³ .......................... B32B 3/26; B32B 3/02
[52] U.S. Cl. ....................................... 410/68; 52/578;
410/91; 428/44; 428/53; 428/156; 428/192
[58] Field of Search .................... 428/44, 53, 54, 156,
428/166, 192; 52/578, 582, 588, 387, 668, 792,
177; 105/422, 423; 108/51.1, 44, 48, 901;
238/14; 296/39 R; D12/82, 95, 101; 410/77–81,
68, 84–86, 140, 156, 91

[56] References Cited

U.S. PATENT DOCUMENTS

| | | | |
|---|---|---|---|
| 2,954,003 | 9/1960 | Farrell et al. | 410/68 |
| 3,909,996 | 10/1975 | Ettinger, Jr. et al. | 52/588 |

*Primary Examiner*—Paul J. Thibodeau

*Attorney, Agent, or Firm*—Robert F. Delbridge; Arne I. Fors

[57] ABSTRACT

Floor matting includes rectangular panels each having a plurality of rows of upstanding hollow bosses. Some of the bosses are located along two sides of the panel and laterally project beyond the sides, and the other two sides of the panel carry a complementary number of upstanding projections insertable into the bosses along the side of an adjacent panel to retain the two panels in side by side relationship. The matting also includes retainers each having a flat base with apertures positioned to correspond with the disposition of the bosses on the panels to enable the base to be mounted on one or more panels with bosses extending into the apertures. Each retainer also has a retainer member projecting upwardly from the base for engagement with an article placed on the matting.

3 Claims, 6 Drawing Figures

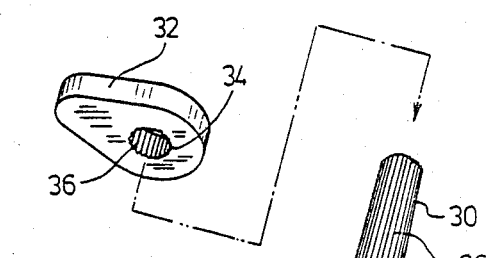
FIG.4.
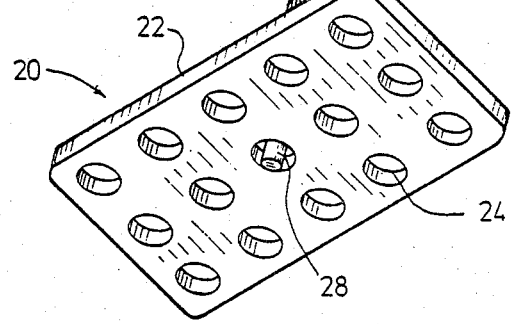
FIG.5.
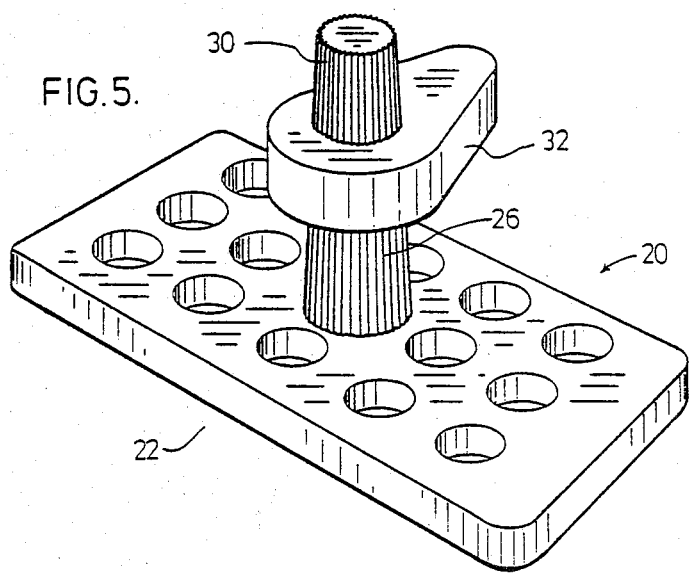

FLOOR MATTING

This invention relates to floor matting for use on the floors of load-carrying areas of vehicles.

When carrying luggage or other personal goods in vehicles, such as cars, trailers or light trucks, such articles may be damaged during transit if they are free to move around in the load-carrying area of the vehicle, particularly if the vehicle changes speed or direction rapidly.

It is known to provide matting for such load-carrying areas, but such known matting has various disadvantages. It may not be readily adaptable to fit in different size areas, or may not effectively prevent movement of a load placed thereon. It is therefore an object of the invention to provide floor matting which can readily be installed over a required area and which can effectively restrict movement of loads placed thereon.

According to the invention, floor matting comprises rectangular panels each having a plurality of rows of upstanding hollow bosses, with some of said bosses being located along two of the sides of the panel and laterally projecting beyond said sides, the other two sides of the panel carrying a complementary number of upstanding projections insertable into the bosses along the side of an adjacent panel to retain the two panels in side by side relationship, the matting also comprising retainers each having a flat base with apertures positioned to correspond with the disposition of the bosses on the panels to enable the base to be mounted on one or more panels with bosses extending into the apertures, each retainer also comprising a retainer member projecting upwardly from the base for engagement with an article placed on the matting.

In use, the panels can be positioned to substantially cover the load-carrying area of the vehicle and interlocked with one another in side by side relationship. The retainers can be appropriately positioned such that movement of articles placed on the matting is effectively restricted by the retainer members.

The panels may be molded from synthetic plastic material, and are advantageously of such a nature that they may be readily cut to conform the periphery of the matting to the periphery of the load-carrying area of the vehicle.

The retainer member of the retainer may comprise a post extending upwardly from the base, and may be also comprise a cam-member positionable in different angular positions on the post so as to more closely restrict movement of an article on the matting. Also, the post may have a downward extension in an aperture in the base which engages in a boss on a panel to provide additional security of attachment of the retainer to a panel.

One embodiment of the invention will now be described, by way of example, with reference to the accompanying drawings, of which:

FIG. 4 is an exploded bottom perspective view of a retainer;

FIG. 5 is a top perspective view of the retainer; and

Figure 1:
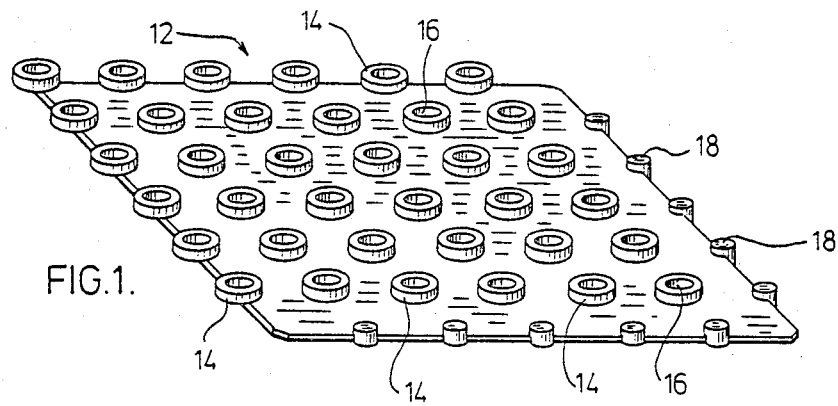
FIG. 1 is a perspective view of a panel.
Figure 2:
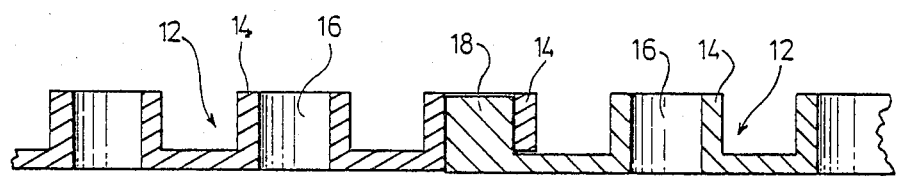
FIG. 2 is an enlarged sectional side view of two panels in side by side interlocking relationship.

Referring to the drawing, floor matting includes a series of square panels 12 of synthetic plastic material. Each panel 12 has several rows of integral upstanding hollow bosses 14, with the openings 16 in the bosses 14 extending through the panel 12 to its lower face. Some of the bosses 14 are located along two adjacent sides of the panel 12 and laterally project beyond the sides. The other two sides of each panel 12 carry a complementary number of upstanding solid projections 18 insertable with a sliding fit into the bosses 16 along the side of an adjacent panel 12 to retain the panels 12 in side by side co-planar relationship with their side edges abutting.

The floor matting also includes retainers 20 each having a flat rectangular base 22 with apertures 24 positioned to correspond with the disposition of the bosses 14 of the panels 12 so that the base 22 can be mounted on the panels 12 with the bosses 14 extending with a sliding fit into the apertures 24. The thickness of the base 22 is equal to the height of the bosses 14 so that the upper surface of the base 22 is level with the top of the bosses 14.

Each retainer 20 also has a retainer member in the form of a post 26 projecting upwardly from the base 22. The post 26 has a downward extension 28 within an aperture 24, the extension 28 being engageable with a sliding fit in the opening 16 of a boss 14. Post 26 has longitudinally extending grooves 30, and a cam member 32 has an aperture 34 with complementary grooves 36 so that the cam member 32 can be fitted over the post 26 with a sliding fit at a predetermined angular disposition in a plane perpendicular to the longitudinal axis of post 26.

Figure 3:
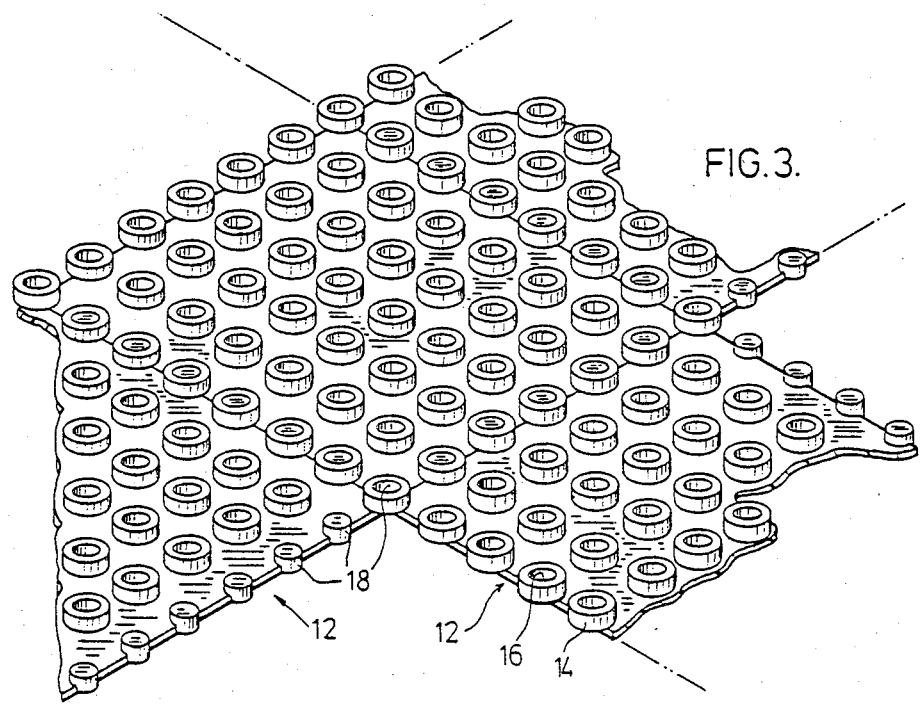
FIG. 3 is a perspective view, partly broken away, of several panels in side by side interlocking relationship.
Figure 6:
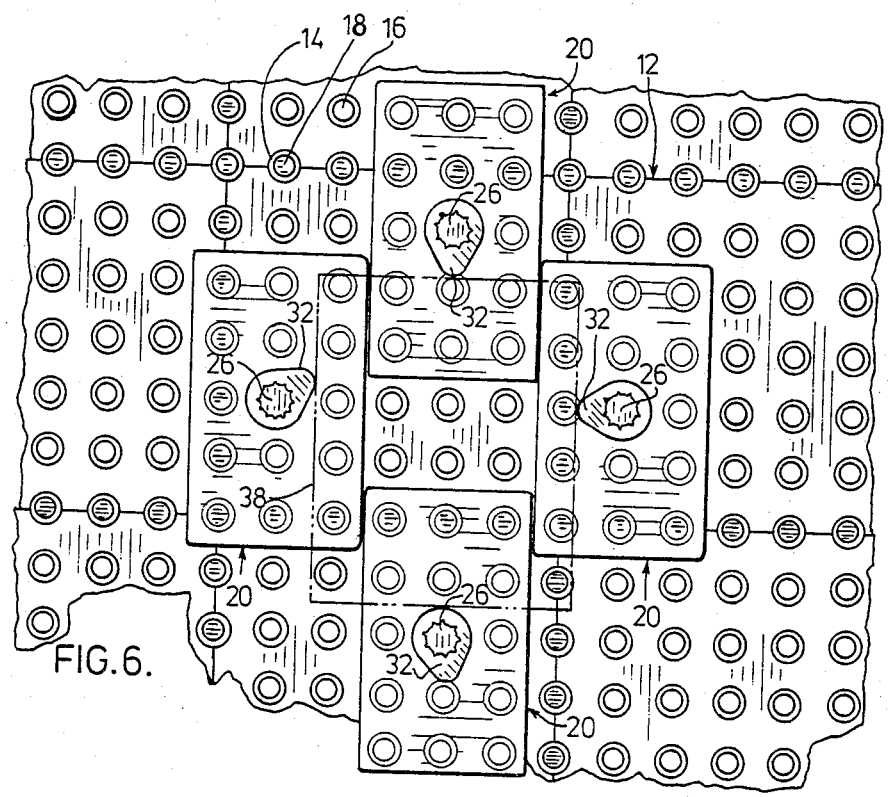
FIG. 6 is a plan view of an article positioned on matting comprising a series of interlocked panels and four retainers holding the article in a desired position.

In use, a number of panels 12 are positioned on the floor of the load carrying area of the vehicle, which may be for example, a car trunk or the load carrying area of a station wagon, truck or trailer. The panels 12 are interlocked with each other by means of the projections 18 and side bosses 14 as previously described, to form a matting covering the floor, as indicated in FIG. 3. Where the complete matting does not fit the periphery of the floor, the panels 12 concerned can readily be cut to shape.

To load an article to be carried, such as the article 38 shown in FIG. 5, four retainers 20 are suitably positioned on the matting as shown, and the article 38 is placed within the area defined by the posts 26. It will be seen that the article 38 rests on the portions of the bases 22 to retain them in position on the panels 12. A cam member 32 is then positioned on each post 26 at such an angle that the cam member 32 engages the adjacent side of the article 38, thereby retaining it in position while the vehicle is moving. It will be noted that the engagement of the extension 28 in the aperture 16 of a boss 14 increases the security of the attachment of the retainer 20 to a panel 12.

Other embodiments will be readily apparent to a person skilled in the art, the scope of the invention being defined in the appended claims.

What I claim as new and desire to protect by Letters Patent of the United States is:

1. Floor matting comprising a plurality of rectangular panels each having a plurality of rows of upstanding hollow bosses, some of said bosses being located along two sides of the panel and laterally projecting beyond said sides, the other two sides of the panel being provided with a complementary number of upstanding projections which are inserted into the laterally projecting bosses of an adjacent panel to retain the panels in side by side relationship, the matting also comprising one or more retainers mounted thereon each of said retainers having a flat base with apertures positioned to correspond with the disposition of the bosses on the panels to enable the base to be mounted on one or more panels with bosses extending into the apertures, and each retainer also comprising a retainer member projecting upwardly from the base for engagement with an article placed on the matting.

2. Floor matting according to claim 1 wherein the retainer member comprises a post extending upwardly from the base, and a cam-like member positionable in different angular positions on the post so as to more closely restrict movement of an article on the matting.

3. Floor matting according to claim 1 wherein the retainer member comprises a post extending upwardly from the base, the post having a downward extension with an aperture which engages in a boss in a panel to increase the security of attachment of the retainer to the panel.

* * * * *